United States Patent Office 3,278,650
Patented Oct. 11, 1966

3,278,650
O,O-DIMETHYLPHOSPHORODITHIO SUCCINAMIDE
Eugene F. Barnas and Sidney B. Richter, Chicago, Ill., assignors to Velsicol Chemical Corporation, Chicago, Ill., a corporation of Illinois
No Drawing. Filed Nov. 12, 1963, Ser. No. 323,144
1 Claim. (Cl. 260—942)

This invention relates to new chemical compositions of matter. More specifically, this invention relates to a new chemical compound, hereinafter referred to as N,N'-diisopropoxy - N,N' - dimethyl - α - (O,O - dimethyl-phosphorodithio)succinamide, having the formula

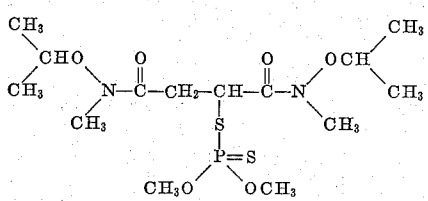

This new chemical compound is useful as a pesticide, particularly as an insecticide and a miticide.

The new compound of the present invention can be prepared readily from the corresponding haloalkyl or alkenyl diacid. The corresponding haloalkyl diacids, α-chlorosuccinic acid or α-bromosuccinic acid, or the alkenyl diacids, maleic of fumaric acid, or the anhydride of any of the above where available, can be converted to its acid halide and the acid halide treated with N-isopropoxy-N-methylamine to form the diamide, which is then reacted at its unstaturation or at its halogen substitution with O,O-dimethyl dithiophosphate or its alkali metal salt to form the desired compound of the present invention.

More particularly, in the preparation of the compound of the present invention, the starting material diacid is treated with twice the molecularly equivalent quantity of a suitable agent, such as thionyl chloride or phosphorus trihalide to form the acid halide. The conversion to the acid halide can be performed by heating for several hours, preferably at reflux. The corresponding acyl halide thus formed can be isolated from the reaction mixture by means common to the art, such as by distillation in vacuo of the solvent or diluent and unreacted reactants, leaving the acyl halide as the residue.

In the next step, the acyl halide is reacted with a molecularly equivalent quantity, or greater amount of N-isopropoxy-N-methylamine, or preferably its hydrochloride, for each acid halide group present, in the presence of a base, such as an alkali metal base, of which sodium hydroxide, potassium hydroxide and potassium carbonate are exemplary. At least one molecular equivalent quantity of base is used when the free amine is utilized as the reactant, and at least twice that amount is used when the amine-hydrochloride is used as the reactant. The base is used to release the amine from its hydrochloride and to neutralize the hydrogen chloride formed during the reaction. A small amount of water is preferably added to the reaction mixture to form an aqueous solution of the base to aid in mixing the base into the solution of the amine or amine-hydrochloride reactant.

This reaction is conveniently performed by contacting the reactants for several hours at a temperature from about —20° to about room temperature or higher. Thus when a halogen atom is in the alpha position, reaction at temperatures of from about —15° C. to about 10° C. is preferred, whereas when such a group is not present, reaction at about room temperature or higher is preferred. It has also been found convenient to utilize a solvent or diluent to aid in temperature control.

The resulting diamide formed by the above procedure can be separated from the reaction mixture by means common to the art, such as by separating the organic layer, washing this layer with potassium carbonate solution to remove excess acid chloride and then with water to remove salts, and drying and distilling the organic layer in vacuo to remove solvent to recover the amide as the residue. The amide thus obtained can be used in the next step as such, or can be purified by means common to the art, such as recrystallization from a suitable solvent.

The final step in the preparation of the compound of the present invention is the reaction of the alkenyl diamide or the haloalkyl diamide intermediate with O,O-dimethyl dithiophosphate, or its alkali metal salt.

Thus where the alkenyl diamide intermediate is utilized it is preferred to react the said intermediate with the phosphorus acid. At least molecular equivalent proportions of the reactants should be used, although it is desirable to use an excess of the phosphorus acid. The reaction can be carried out without a solvent, but inert solvents or diluents can be used if desired. Although the exact temperature at which the reaction is performed is not critical, reaction temperatures in the range from about normal room temperature to about 80° C. are preferred. It is also preferred to add a small amount of oxidation inhibitor such as hydroquinone to the reaction mixture. After the reaction is completed, the mixture is filtered, washed with a dilute aqueous base solution such as an aqueous solution of sodium or potassium carbonate, washed with water, dried, and the solvent distilled off in vacuo to recover the crude product of the present invention as the residue. This crude product is often sufficiently pure for pesticidal use as such, or if desired can be purified by means common to the art, such as chromatography.

Where the intermediate is a haloalkyl diamide, it is preferred to react the said intermediate with the alkali metal salt of the phosphorous acid. This reaction readily takes place by contacting an excess above the molecular equivalent quantity of the alkali metal salt of the phosphorus acid with the intermediate in the presence of a suitable solvent or diluent such as benzene. The reaction mixture is heated for several hours, preferably at reflux. After the reaction is completed, the reaction mixture is filtered, and processed as described above to recover the crude product of the present invention as the residue which may be purified as described above if desired.

The manner in which the new compound of this invention can be prepared is illustrated in the following examples:

EXAMPLE 1

Preparation of N,N'-diisopropoxy-N,N'-dimethyl-fumaramide

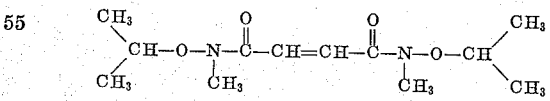

Sodium hydroxide (6.4 g.) was dissolved into water (40 ml.) in a 250 ml., three-necked, round-bottom flask, fitted with a mechanical stirrer and cooling bath. 1,2-dichloroethane (100 ml.) was added and the mixture stirred and cooled for several minutes. N-isopropoxy-N-methylamine-hydrochloride (10.1 g.) was added and stirring and cooling was continued for about five minutes. To the above mixture was added fumaryl chloride (6.1 g.; 0.04 mol) over a period of ten minutes during which time the temperature of the reaction mixture was maintained at between 0° C. and 6° C. After the addition was complete the mixture was stirred for 1½ hours, poured into a separatory funnel and the aqueous phase drawn off. The organic layer was washed with 5% aqueous sodium carbonate solution and then with water, dried over magnesium sulfate, filtered, and the filtrate stripped of dichloroethane in vacuo, leaving an oil as the residue which solidified to a white solid on standing. The crude solid product was recrystallized from hexane to yield white prisms of N,N'-diisopropoxy-N,N'-dimethylfumaramide melting 91.5–94° C. and having the following elemental analysis as calculated for—$C_{12}H_{22}N_2O_4$:

|  | N |
|---|---|
| Theoretical, percent | 10.85 |
| Found, percent | 10.95 |

EXAMPLE 2

*Preparation of N,N'-diisopropoxy-N,N'-dimethyl-α-(O,O-dimethylphosphorodithio)succinamide*

N,N' - diisopropoxy - N,N' - dimethylfumaramide (5 g.; 0.019 mol) prepared in Example 1, was placed into a 250 ml., three-necked, round-bottom flask equipped with a reflux condenser and a mechanical stirrer. Benzene (75 ml.) and hydroquinone (0.1 g.) were added, the mixture stirred, O,O-dimethyldithiophosphate (4 g.) added over a period of five minutes, additional benzene (75 ml.) added and the resulting mixture stirred and heated at reflux for about 16 hours. After cooling, the reaction mixture was filtered and benzene removed from the filtrate by vacuum to leave a dark oil as the residue. This oil was dissolved in diethyl ether, washed with 10% aqueous potassium carbonate solution and then with water, dried over anhydrous magnesium sulfate, filtered and the diethyl ether distilled from the filtrate in vacuo to yield a residual oil which is purified by chromatographing through a column of Florex (diatomaceous earth) (150 g.) to yield the compound of the present invention, N,N'-diisopropoxy - N,N' - dimethyl - α - (O,O - dimethylphosphorodithio)succinamide having the following elemental analysis as calculated for—$C_{14}H_{29}N_2O_4S_2P$:

|  | S | P |
|---|---|---|
| Theoretical, percent | 15.38 | 7.45 |
| Found, percent | 16.22 | 7.08 |

For practical use as an insecticide, the compound of this invention is generally incorporated into insecticidal compositions which comprise an inert carrier and an insecticidally toxic amount of the compound. Such insecticidal compositions, which are usually known in the art as formulations, enable the active compound to be applied conveniently to the site of the insect infestation in any desired quantity. These compositions can be solids such as dusts, granules, or wettable powders; or they can be liquids such as solutions or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, on to and into granulated carriers such as the attapulgites or the vermiculites, usually of a particle size range of from about 0.3 to 1.5 mm. Wettable powders, which can be dispersed in water to any desired concentration of the active compound, can be prepared by incorporating wetting agents into concentrated dust compositions.

In some cases the active compound is sufficiently soluble in common organic solvents such as kerosene or xylene so that it can be used directly as solutions in these solvents. Frequently, solutions of insecticides can be dispersed under superatmospheric pressure as aerosols. However, preferred liquid insecticidal compositions are emulsifiable concentrates, which comprise the active compound according to this invention and as the inert carrier, a solvent and an emulsifier. Such emulsifiable concentrates can be diluted with water to any desired concentration of active compound for application as sprays to the site of the insect infestation. The emulsifiers most commonly used in these concentrates are nonionic or mixtures of nonionic with anionic surface-active agents.

A typical insecticidal composition according to this invention is illustrated by the following example, in which the quantities are in parts by weight.

EXAMPLE 3

*Preparation of a dust*

| Product of Example 2 | 10 |
|---|---|
| Powdered talc | 90 |

The above ingredients are mixed in a mechanical grinder-blender and are ground until a homogeneous, free-flowing dust of the desired particle size is obtained. This dust is suitable for direct application to the site of the insect infestation.

The insecticide of this invention can be applied in any manner recognized by the art. The concentration of the new compound of this invention in the insecticidal compositions will vary greatly with the type of formulation and the purpose for which it is designed, but generally the insecticidal compositions will comprise from about 0.05 to about 95 percent by weight of the active compound of this invention. In a preferred embodiment of this invention, the insecticidal compositions will comprise from about 5 to about 75 percent by weight of the active compound. The compositions can also comprise such additional substances as other pesticides, spreaders, adhesives, stickers, fertilizers, activators, synergists, and the like.

The new compound of this invention can be used in many ways for the control of insects. Insecticides which are to be used as stomach poisons or protective materials can be applied to the surface on which the insects feed or travel. Insecticides which are to be used as contact poisons or eradicants can be applied directly to the body of the insect, as a residual treatment to the surface on which the insect may walk or crawl, or as a fumigant treatment of the air which the insect breathes. In some cases, the compound applied to the soil or plant surfaces is taken up by the plant, and the insects are poisoned systemically.

The above methods of using insecticides are based on the fact that almost all the injury done by insects is a direct or indirect result of their attempts to secure food. Indeed, the large number of destructive insects can be classified broadly on the basis of their feeding habits. There are, for example, the chewing insects such as the Mexican bean bettle, the southern armyworm, cabbageworms, grasshoppers, the Colorado potato beetle, the cankerworm, and the gypsy worm. There are also the piercing-sucking insects, such as the pea aphid, the house fly, the chinch bug, leafhoppers, and plant bugs.

Another group of insects comprises the internal feeders. These include borers such as the European corn borer and the corn earworm; worms or weevils such as the codling moth, cotton boll weevil, plum curculio, melonworm, and the apple maggot; leaf miners such as the apple leaf miner and the beet leaf miner; and gall insects such as the wheat jointworm and grape phylloxera. Insects which attack below the surface of the ground are classified as subterranean insects and include such destructive pests as the woolly apple aphid, the Japanese beetle, and the corn rootworm.

Mites and ticks are not true insects. Many economically important species of mites and ticks are known, including the red spider mite, the strawberry spider mite, the cattle tick, and the poultry mite. Chemicals useful for the control of mites are often called miticides, while those useful for the control of both mites and ticks are known specifically as acaricides.

The quantity of active compound of this invention to be used for insect control will depend on a variety of factors, such as the specific insect involved, intensity of the infestation, weather, type of environment, type of formulation, and the like. For example, the application of only one or two ounces of active chemical per acre may be adequate for control of a light infestation of an insect under conditions unfavorable for its feeding, while a pound or more of active compound per acre may be required for the control of a heavy infestation of insects under conditions favorable to their development.

The compound of the present invention is also useful as a lubricant additive. The addition of the present compound to heavier hydrocarbon fractions produces improved gear lubricants.

The utility of the compound of the present invention was illustrated, for example, by experiments carried out for the control of insects. The test compound was formulated by dissolving the compound in acetone and dispersing the acetone solution in distilled water containing 0.2% by volume of alkyl aryl polyether alcohol type emulsifier.

In one experiment fifty adult houseflies of the CSMA strain were placed in a 2-inch by 5-inch diameter stainless steel cage having screening (14 mesh) at its top and bottom. The flies were sprayed with the above formulation containing the amount of test compound indicated below, and the mortality observed 24 hours after spraying. In this experiment the product of Example 2 gave the following results:

| Concn., percent actual chem. (weight/volume liquid sprayed): | Percent mortality |
|---|---|
| 0.35 | 100 |
| 0.0 (control) | 0 |

The utility of the compound of this invention was further illustrated by additional experiments carried out for the control of insects by feeding. In these experiments, Lima bean leaves sprayed on their top and bottom surfaces with the above formulation at the concentrations indicated below were offered to ten larvae of the Mexican bean beetle (late second instar stage) for a feeding period of 48 hours. After this period the mortality was observed. In these experiments the product of Example 2 gave the following results:

| Concn., percent actual chem. (weight/volume liquid sprayed): | Percent mortality |
|---|---|
| 0.35 | 100 |
| 0.10 | 100 |
| 0.0 (control) | 0 |

In still another test, the utility of the compound of this invention as an insecticide was further illustrated by spraying adult pea aphids with the above formulation containing the indicated amount of test compound, transferring the aphids to pea plants also sprayed with the formulation, and observing the mortality after 48 hours. The product of Example 2 gave the following results:

| Concn., percent actual chem. (weight/volume liquid sprayed): | Percent mortality |
|---|---|
| 0.35 | 100 |
| 0.10 | 100 |
| 0.0 (control) | 0 |

The utility of the compound of the present invention as a miticide was illustrated in experiments for the control of strawberry spider mites (*Tetranychus atlanticus*). In these experiments Lima bean plants previously infested with from 50 to 100 adults of the mites were dipped into the formulations and held for five days. Thereafter the adult mortality was observed. The product of Example 2 gave the following results in these experiments.

| Concn., percent actual chem. (weight/volume liquid sprayed): | Percent mortality |
|---|---|
| 0.35 | 100 |
| 0.10 | 100 |
| 0.0 (control) | 0 |

We claim:
A compound of the formula

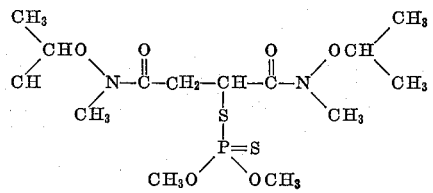

References Cited by the Examiner

UNITED STATES PATENTS

| 2,968,591 | 1/1961 | Tracy | 167—22 |
| 3,017,422 | 1/1962 | Thompson | 260—461 |
| 3,079,417 | 2/1963 | Farrar | 260—461 |
| 3,080,274 | 3/1963 | Legator et al. | 167—22 |

FOREIGN PATENTS

| 1,311,263 | 10/1962 | France. |

CHARLES B. PARKER, *Primary Examiner.*

JOSEPH P. BRUST, *Examiner.*

RICHARD L. RAYMOND, *Assistant Examiner.*

UNITED STATES PATENT OFFICE
CERTIFICATE OF CORRECTION

Patent No. 3,278,650                            October 11, 1966

Eugene F. Barnas, et al.

It is hereby certified that error appears in the above numbered patent requiring correction and that the said Letters Patent should read as corrected below.

Column 1, line 29, for "maleic of" read -- maleic or --; column 6, line 31, for that portion of the formula reading

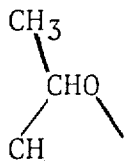      read      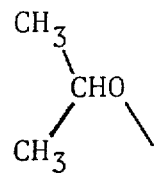

Signed and sealed this 29th day of August 1967.

(SEAL)
Attest:

ERNEST W. SWIDER                          EDWARD J. BRENNER
Attesting Officer                               Commissioner of Patents